US012203880B2

(12) United States Patent
Wagner et al.

(10) Patent No.: US 12,203,880 B2
(45) Date of Patent: Jan. 21, 2025

(54) IMAGE PROCESSING AND DETECTION OF DISCONTINUITIES IN BATTERY CELLS

(71) Applicant: GM GLOBAL TECHNOLOGY OPERATIONS LLC, Detroit, MI (US)

(72) Inventors: Sean Robert Wagner, Shelby Township, MI (US); Megan E. McGovern, Detroit, MI (US); Dmitriy Bruder, Clinton Township, MI (US); Ratandeep Singh Kukreja, Auburn Hills, MI (US); Michael P. Balogh, Novi, MI (US); Ryan Curtis Sekol, Grosse Pointe Woods, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 397 days.

(21) Appl. No.: 17/665,829

(22) Filed: Feb. 7, 2022

(65) Prior Publication Data
US 2023/0251212 A1   Aug. 10, 2023

(51) Int. Cl.
| | |
|---|---|
| *G01N 23/18* | (2018.01) |
| *G01N 23/083* | (2018.01) |
| *G06T 5/50* | (2006.01) |
| *G06T 7/00* | (2017.01) |
| *H01M 10/04* | (2006.01) |

(52) U.S. Cl.
CPC ........... *G01N 23/18* (2013.01); *G01N 23/083* (2013.01); *G06T 5/50* (2013.01); *G06T 7/001* (2013.01); *H01M 10/04* (2013.01); *G01N 2223/401* (2013.01); *G01N 2223/611* (2013.01); *G06T 2207/10116* (2013.01); *G06T 2207/20081* (2013.01); *G06T 2207/20224* (2013.01)

(58) Field of Classification Search
CPC ................ G01N 23/18; G01N 23/083; G01N 2223/401; G01N 2223/611; G06T 5/50; G06T 7/001; G06T 2207/10116; G06T 2207/20081; G06T 2207/20224; G06T 7/73; G06T 2207/10081; H01M 10/04; H01M 10/4285
See application file for complete search history.

(56) References Cited

U.S. PATENT DOCUMENTS

| | | | | |
|---|---|---|---|---|
| 4,335,427 A | * | 6/1982 | Hunt .................... | H04N 5/3205 600/407 |
| 2006/0291742 A1 | * | 12/2006 | Zhang ....................... | G06T 5/40 382/266 |
| 2019/0294923 A1 | * | 9/2019 | Riley ...................... | G06F 18/24 |

FOREIGN PATENT DOCUMENTS

WO   WO-2019117228 A1 * 6/2019

\* cited by examiner

*Primary Examiner* — Pinalben Patel
(74) *Attorney, Agent, or Firm* — CANTOR COLBURN LLP (57) ABSTRACT

A system for evaluating a battery cell includes an imaging device configured to take an image of at least part of the battery cell, and a processor. The processor is configured to perform: determining a region of interest in the acquired image, reducing a sharpness of the acquired image to generate a reference image, comparing the acquired image and the reference image, and identifying a discontinuity of the battery cell based on a difference between the acquired image and the reference image.

20 Claims, 8 Drawing Sheets

IMAGE PROCESSING AND DETECTION OF DISCONTINUITIES IN BATTERY CELLS

INTRODUCTION

The subject disclosure relates to battery inspection, and more particularly to detecting discontinuities in battery cells.

Battery pouch cells are used in various applications, such as automotive applications (e.g., in electric and hybrid vehicles). Tears and other discontinuities can occur in parts of a battery cell, such as anode and cathode foils. Such discontinuities can result in short circuits and other malfunctions. Inspection of battery cells and their constituents is important in order to ensure proper function and detect discontinuities before they can negatively impact such cells.

SUMMARY

In one exemplary embodiment, a system for evaluating a battery cell includes an imaging device configured to take an image of at least part of the battery cell, and a processor. The processor is configured to perform: determining a region of interest in the acquired image, reducing a sharpness of the acquired image to generate a reference image, comparing the acquired image and the reference image, and identifying a discontinuity of the battery cell based on a difference between the acquired image and the reference image.

In addition to one or more of the features described herein, the acquired image is acquired using direct x-ray radiography.

In addition to one or more of the features described herein, the comparing includes subtracting an image attribute of the reference image from an image attribute of the acquired image to generate a subtracted image, the subtracted image providing an enhanced view of the discontinuity.

In addition to one or more of the features described herein, the image attribute is selected from at least one of a brightness, a contrast and a gray scale.

In addition to one or more of the features described herein, the comparing includes at least one of applying a derivative in a selected direction on the subtracted image, and applying a filter to the subtracted image.

In addition to one or more of the features described herein, determining the region of interest is based on at least one of: a rule-based algorithm configured to identify the region of interest based on a rule that specifies a location of a section of the image that includes one or more features of interest, and/or an image attribute threshold associated with the one or more features of interest, and a machine learning algorithm configured to identify the region of interest based on training images of the battery cell and/or one or more similar battery cells.

In addition to one or more of the features described herein, the imaging device is configured to automatically take images in conjunction with a battery cell manufacturing process, the imaging device including an x-ray source and an x-ray detector mounted on a support structure, the support structure disposed on at least one of a battery cell manufacturing station and a battery cell inspection station.

In one exemplary embodiment, a method of evaluating a battery cell includes acquiring an image of at least part of the battery cell, determining a region of interest in the acquired image, reducing a sharpness of the acquired image to generate a reference image, comparing the acquired image and the reference image, and identifying a discontinuity of the battery cell based on a difference between the acquired image and the reference image.

In addition to one or more of the features described herein, the acquired image is acquired using direct x-ray radiography.

In addition to one or more of the features described herein, the comparing includes subtracting an image attribute of the reference image from an image attribute of the acquired image to generate a subtracted image, the subtracted image providing an enhanced view of the discontinuity.

In addition to one or more of the features described herein, the image attribute is selected from at least one of a brightness, a contrast and a gray scale.

In addition to one or more of the features described herein, the comparing includes at least one of: applying a derivative in a selected direction on the subtracted image, and applying a filter to the subtracted image.

In addition to one or more of the features described herein, determining the region of interest is based on a rule-based algorithm configured to identify the region of interest based on a rule that specifies a location of a section of the image that includes one or more features of interest, and/or an image attribute threshold associated with the one or more features of interest.

In addition to one or more of the features described herein, determining the region of interest is based on a machine learning algorithm configured to identify the region of interest based on training images of the battery cell and/or one or more similar battery cells.

In addition to one or more of the features described herein, acquiring the acquired image is performed in-line during a process of manufacturing the battery cell.

In one exemplary embodiment, a system for evaluating a battery cell includes an imaging device configured to automatically take one or more images of at least part of the battery cell in conjunction with a process of manufacturing the battery cell, the imaging device including an x-ray source and an x-ray detector mounted on a support structure, the support structure disposed on at least one of a battery cell manufacturing station and a battery cell inspection station. The system also includes a processor configured to acquire the image and process the image to identify a discontinuity of the battery cell.

In addition to one or more of the features described herein, the processor is configured to perform: acquiring an image of at least part of the battery cell, determining a region of interest in the acquired image, reducing a sharpness of the acquired image to generate a reference image, comparing the acquired image and the reference image, and identifying the discontinuity of the battery cell based on a difference between the acquired image and the reference image.

In addition to one or more of the features described herein, the comparing includes subtracting an image attribute of the reference image from an image attribute of the acquired image to generate a subtracted image, the subtracted image providing an enhanced view of the discontinuity.

In addition to one or more of the features described herein, the comparing includes at least one of: applying a derivative in a selected direction on the subtracted image, and applying a filter to the subtracted image.

In addition to one or more of the features described herein, the imaging device is configured to automatically take the one or more images in-line during the process of manufacturing the battery cell.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

In accordance with one or more exemplary embodiments, methods, devices and systems are provided for inspecting or evaluating battery cells, and/or non-destructively detecting discontinuities in battery cells. Embodiments include a method of evaluating a pouch-type battery cell or other type of battery cell, which includes detecting discontinuities based on images of the battery cell taken during or after a battery manufacturing process.

An embodiment of a method includes taking at least one image of a portion of a battery cell. In an embodiment, an image or images are taken using an imaging technique such as direct x-ray radiography. The image or images may be taken in-line or off-line in conjunction with a battery manufacturing process. Imaging can be performed in-line during manufacturing, for example, at a manufacturing station. In addition, or alternatively, imaging can be performed off-line, for example, during quality control or inspection.

In an embodiment, the method includes determining a region of interest of an acquired image, and processing the acquired image to enhance features of interest and/or discontinuities (e.g., pores, tears, folds, etc.). For example, an acquired image is blurred to reduce contrast, generating a reference image or blurred image. The blurred image is then compared to the acquired image, for example, by subtracting an image attribute such as brightness or gray scale. The resulting subtracted image enhances any features and/or discontinuities. The subtracted image may be further processed to further enhance the features and/or discontinuities. Discontinuity detection may be performed using a machine learning algorithm or other suitable technique.

Embodiments described herein present numerous advantages and technical effects. The embodiments provide for an improved evaluation method, which is able to more effectively detect discontinuities via the enhancement of x-ray or other images. The embodiments also simplify evaluation by allowing for detection without the need to disassemble or tear down a battery cell.

In addition, the methods provide a reliable and repeatable detection process that can be performed in an automated fashion as part of a manufacturing process or in any other desired context.

Figure 1:
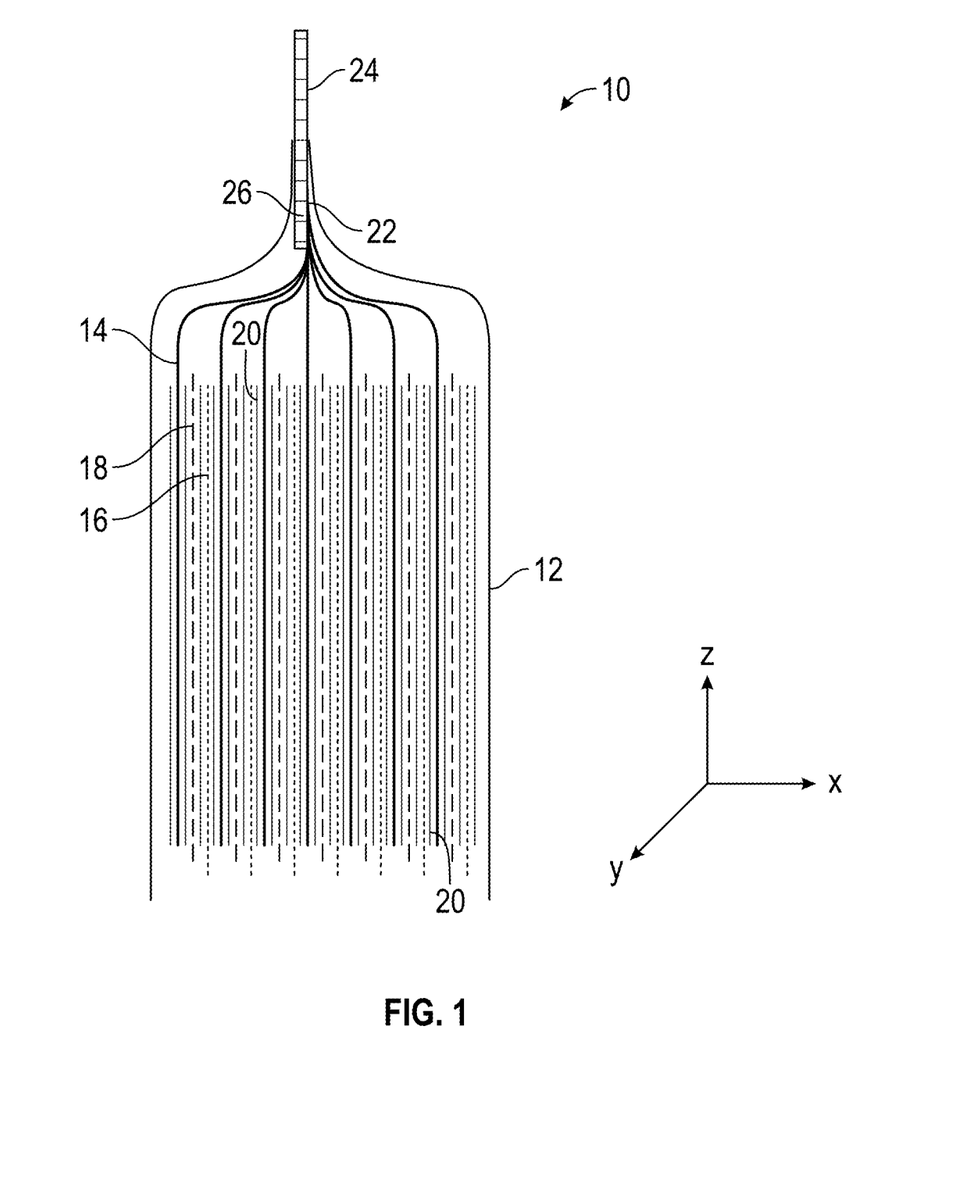
FIG. 1 depicts an example of a pouch-type battery cell.

FIG. 1 depicts an example of a pouch-type battery cell 10 that can be inspected or analyzed via the systems and methods described herein. It is noted that the embodiments described herein are not limited to the specific example of FIG. 1, or any other specific battery type.

The battery cell 10 includes a flexible envelope or pouch 12 that is sealed to enclose a plurality of stacked unit cells (cell stack). The pouch 12 may be an aluminum laminated foil or other suitable pouch material. Each unit cell includes a negative electrode or anode 14, and a positive electrode or cathode 16. The anodes and cathodes are made from selected electrically conductive materials and configured as thin sheets or foils. Each unit cell also includes a separator 18 made from an electrically insulating material such as a polymer or a ceramic. An active material 20, such as a graphite or a material including Lithium, is disposed in the pouch 12 between the various layers of the unit cells.

As shown in FIG. 1, each anode 14 (also referred to as an anode foil) extends away from the unit cells, and the anode foils 14 are attached together as a foil stack 22. The foil stack 22 welds foils together by, for example, a primary ultrasonic weld. The foil stack 22 is in turn attached to an electrically conductive tab 24 via a weld 26. The weld 26 may be a solid-state weld joint formed through ultrasonic welding or a fusion weld joint formed through laser welding, although other metal-to-metal joining procedures may be used. The tab 24 in this example is a negative terminal tab. The cathode foils 16 may be similarly welded to a positive terminal tab 28 (shown in FIGS. 2A and 2B) that extends to an exterior of the pouch 12.

Methods of inspecting the battery cell 10 and identifying discontinuities discussed herein may be performed at any time during or after manufacture of the battery cell 10. Acquisition of images may be performed in-line during manufacturing, or off-line, such as via a dedicated inspection station of completed battery cells. In-line acquisition may occur, for example, after welding and prior to filling with electrolyte, or prior to battery module assembly in which multiple cells are stacked or otherwise combined.

A battery cell such as the cell 10 may be imaged according to any desired imaging technique. For example, battery cells can be imaged using x-ray radiography, optical imaging, magnetic resonance imaging, microwave imaging, neutron imaging and others. X-ray radiography includes direct radiography and x-ray computed tomography (CT). Other types of imaging that can be used include ultrasound imaging.

In an embodiment, battery cells are imaged using direct radiography, which is relatively fast while providing sufficient resolution for detecting discontinuities. X-ray CT tomography may be unsuitable in some instances due to, for example, resolution and cycle time constraints. Both x-ray CT and direct radiography (DR) are known to have difficulty in detecting discontinuities such as foil tears in battery cells, including tears at or near weld lines. Discontinuities due to cracks and tears in battery cell foils are difficult to detect due to relatively low changes in x-ray attenuation, between discontinuous and continuous regions. The use of direct radiography in conjunction with image processing as discussed further herein is effective in increasing the detectability of these discontinuities.

Figure 2A:
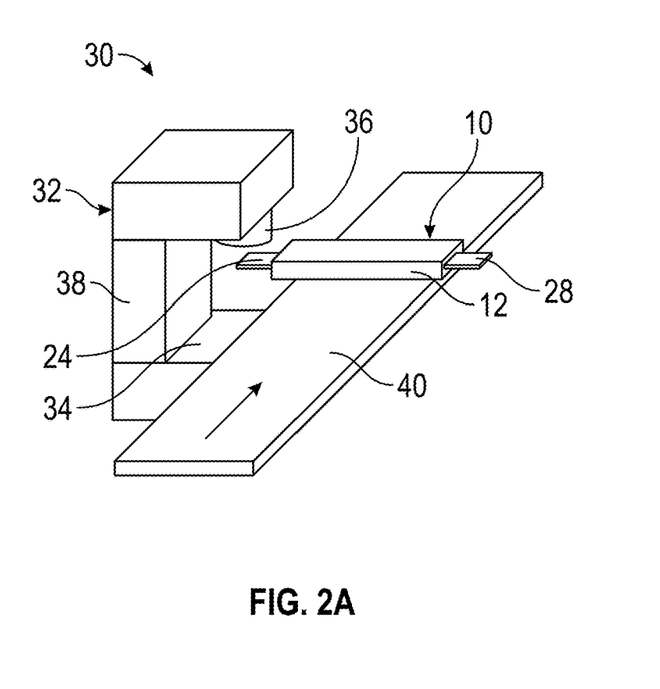
FIGS. 2A and 2B depict an embodiment of an imaging system configured for use as part of a manufacturing process.
Figure 2B:
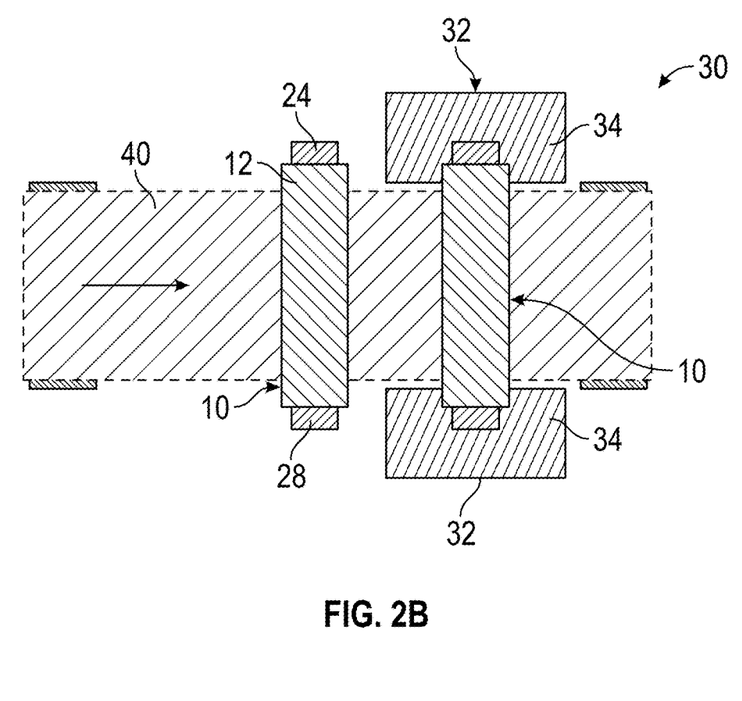

FIGS. 2A and 2B depict an embodiment of an imaging system 30 that can be incorporated into an existing manufacturing system for in-line imaging of battery cells 10. FIG. 2A is a perspective view of the imaging system 30, and FIG. 2B is a top view of the imaging system 30.

The imaging system 30 includes at least one imaging assembly 32 that includes an x-ray detector 34 and an x-ray source 36, which are attached to a support structure 38. The support structure 38 is disposed at a fixed position relative to a conveyor 40 that transports battery cells 10 between manufacturing stages. The conveyor 40 is configured to transport battery cells 10 from, for example, a welding station to a lamination station (not shown). The imaging system 30 may include one imaging assembly as shown in FIG. 2A, or including opposing imaging assemblies 32 so that both anode tabs 24 and cathode tabs 28 (and portions of the cell case 12) can be imaged simultaneously.

Figure 3:
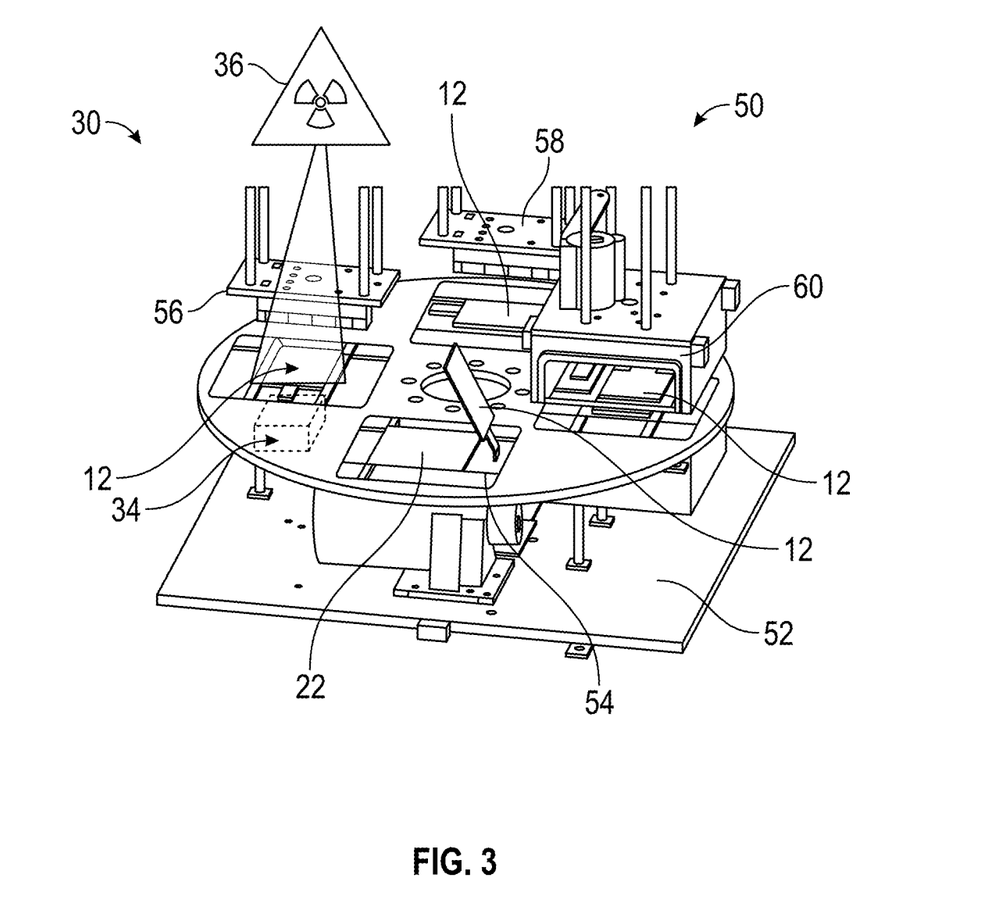
FIG. 3 depicts an embodiment of an imaging system configured for use as part of a manufacturing process.

FIG. 3 shows another embodiment of the imaging system 30, which is configured to image battery cells 10 as the cells 10 advance through a sealing station 50. The sealing station 50 includes a rotary table system 52 that includes four cell holders 54. Each cell holder 54 supports a foil cell stack 22 and a pouch 12. After the cell stack 22 and pouch 12 are mounted in the holder 54, the table is rotated to move the holder to a top sealer 56 that seals a top portion of the pouch 12, and then to a side sealer 58 that seals the sides of the pouch 12, leaving one side open for filling. The holder 54 then moves to a vacuum sealing and filling assembly 60 that fills the pouch 12 with electrolyte and vacuum seals the pouch 12. The imaging system 30, including the x-ray source 36 and the x-ray detector 34, is shown as being configured to image the cell stack 22 and the pouch 12 at the top sealer 56; however, the imaging system 30 may be disposed at any suitable location.

It is noted that imaging may be performed at any desired stage(s) of the manufacturing process, and is not limited to the specific embodiments discussed herein. For example, imaging may be performed at end of line (EOL) inspection, post weld and before filling, during module assembly and/or at an offline station.

Figure 4:
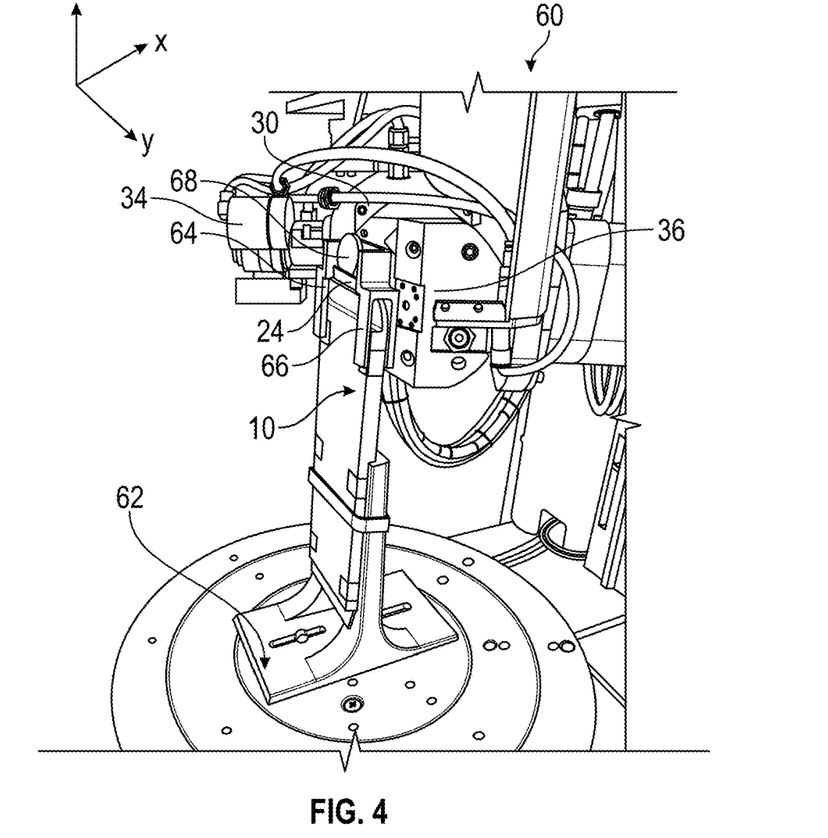
FIG. 4 depicts an embodiment of an imaging system incorporated in an example of an inspection station for inspection of a battery cell.

FIG. 4 depicts an example of an off-line station 60 in which the imaging system 30 can be incorporated. The off-line station 60 includes a support structure or holding fixture 62 for securing a battery cell 10 in a stationary position. The imaging assembly 30 includes the x-ray detector 34 and the x-ray source 36, which are positioned and oriented to image at least part of the battery cell 10, such as a portion of the cell 10 that includes a foil stack, tab and weld. Optionally, the station 60 includes a deformation assembly 64 having a support structure 66 and a deformation or bending feature such as a plastic disc 68 in connection with an actuator (not shown). As discussed further herein, in some embodiments, imaging methods may include deforming the battery cell 10 (e.g., bending the tab 24) and taking images of the battery cell 10 in different deformation states to facilitate feature and discontinuity detection.

Figure 5:
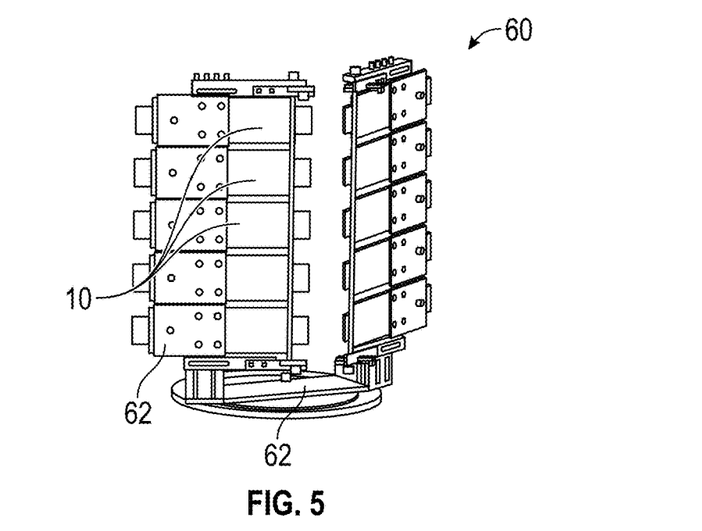
FIG. 5 depicts another example of an inspection station.

FIG. 5 depicts another example of the off-line station 60. In this example, the holding fixture 62 can support a plurality of battery cells 10. An imaging system 30 may be disposed relative to the off-line station 60, and either the imaging system 30 or holding fixture 62 can be moveable so that images of each battery cell 10 can be taken.

Figure 6:
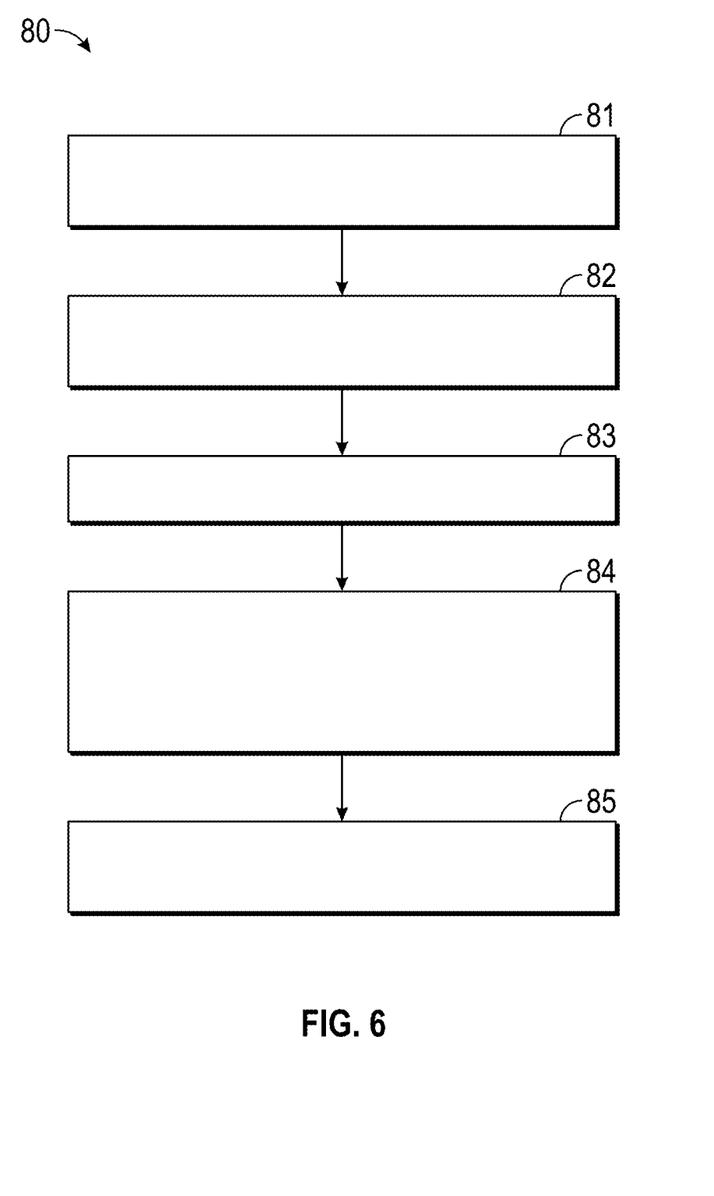
FIG. 6 is a flow diagram depicting aspects of an embodiment of a method of evaluating or inspecting a battery cell and/or detecting discontinuities in a battery cell.

FIG. 6 illustrates an embodiment of a method 80 of inspecting a battery cell and/or detecting or identifying discontinuities. Aspects of the method 80 may be performed by a processor or processors. It is noted the method 80 may be performed by any suitable processing device or system, or combination of processing devices.

The method 80 includes a number of steps or stages represented by blocks 81-85. The method 80 is not limited to the number or order of steps therein, as some steps represented by blocks 81-85 may be performed in a different order than that described below, or fewer than all of the steps may be performed.

Aspects of the method 80 are discussed in conjunction with the battery cell 10 shown in FIG. 1, for illustration purposes. The method 80 is not so limited and can be used with any type of battery cell.

At block 81, images of the battery cell 10 are acquired. The images may be taken via an x-ray radiography technique such as direct x-ray radiography, or other suitable modality. Examples of other types of images that can be taken include optical images, ultrasound images and others.

The images may be taken during or after manufacturing of the battery cell 10. For example, images can be taken during manufacturing using an imaging system incorporated into a manufacturing line (e.g., the conveyor 40 of FIGS. 2A and 2B, or the station 50 of FIG. 3). Images may also be taken after manufacturing, for example, using the inspection station 60 of FIG. 4 or FIG. 5.

Parameters of x-ray radiation directed to the battery cell 10 may be selected to increase the contrast between regions of the battery cell 10. For example, the x-ray tube voltage (measured in kilovolts or kV), current (measured in microamps or μA), and/or number of frames averaged can be selected to provide a high latitude or local contrast to increase visibility of discontinuities. For example, the tube voltage is a minimum voltage that is selected so that x-rays do not penetrate (or minimally penetrate) a weld region of a battery cell, which improves contrast between the air and foils to enhance foil tears and other discontinuities.

Figure 7A:
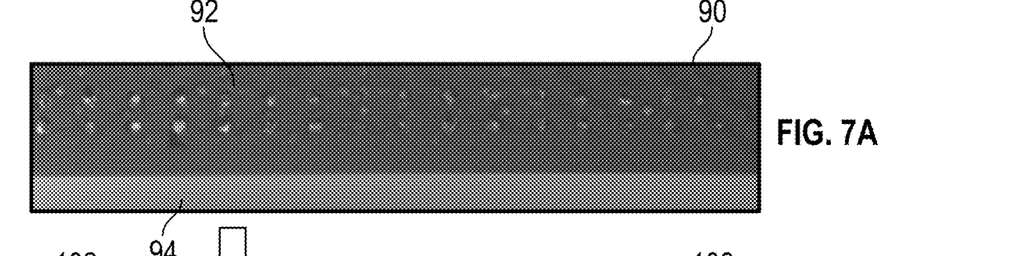
FIGS. 7A and 7B depict examples of x-ray images of a portion of a battery cell.

FIG. 7A shows an example of an x-ray radiographic image 90 of a portion of the battery cell 10 using conventional x-ray parameters. A region 92 of the image 90 (i.e., a weld region 92) displays part of a weld connecting the cell's foil stack to a tab, and a region 94 of the image 90 (i.e., a foil region 94) displays part of a foil stack.

Figure 7B:
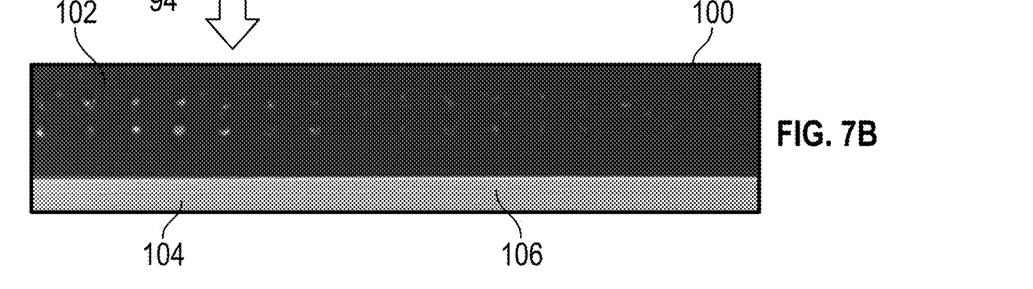

FIG. 7B shows an example of an x-ray radiographic image 100 as acquired by an imaging system (e.g., the imaging system 30) using the selected x-ray parameters. A region 102 of the image 100 (i.e., a weld region 102) displays part of the weld, and a region 104 of the image 100 (i.e., a foil region 104) displays part of the foil stack. As can be seen, selection of the x-ray parameters as described herein significantly increases the contrast between the weld and the foil stack, and also increases the sharpness of a weld line at an edge of the weld. In addition, the image 100 reveals features such as a fold 106 in the foil, which is not readily discernable in the image 90.

Referring again to FIG. 6, at block 82, an acquired image (or images) may be pre-processed to increase visibility of any discontinuities and/or other features of the battery cell. Examples of pre-processing techniques include digital filtering (e.g., Wallis Filter, Emboss Filter, Edge detection, etc.) and histogram weighting to increase discontinuity contrast.

At block 83, a processor determines a region of interest in the acquired image. The region of interest may be determined by analyzing the acquired image using various image processing techniques or algorithms. An acquired image may include one or multiple regions of interest.

In an embodiment, a region of interest is determined using a rule-based methodology. One or more rules may be specified as a function of location and/or image attribute. An image attribute threshold (e.g., a threshold value of color, gray scale or brightness) may be selected to emphasize regions of the battery cell 10 that may be subject to tears or other discontinuities. For example, the one or more rules can include a rule specifying that a region of interest is a region having a gray scale that is lighter than a selected threshold, and/or a contrast spread that is higher than a selected threshold.

The one or more rules may include a location rule that specifies regions corresponding to locations on the battery cell 10 that can be subject to discontinuities. For example, the acquired image is analyzed according to rules that specify the location or position of a foil stack and/or weld line in a typical battery cell.

In an embodiment, a region of interest is determined using a machine learning algorithm, such as object tracking, digital image correlation, neural networks, classifiers, supervised and unsupervised machine learning, image cross correlation, histogram of gradients and other techniques. Any combination of the above techniques may be employed. The machine learning algorithm is trained using images of the battery cell 10 and/or similar battery cells. For example, images of battery cells are acquired and labeled to identify regions of interest, such as weld regions, weld lines and foil stack regions. The training allows the algorithm to identify regions of interest based on the labeled images.

At block 84, an automated vision algorithm is used as part of the region of interest determination and/or to identify tears or other discontinuities. In an embodiment, the vision algorithm is a machine learning algorithm configured to identify discontinuities based on training with images (e.g., labeled images) of known discontinuities (e.g., tears and folds). The machine learning algorithm may be a neural network, supervised learning algorithm and/or any other machine learning or artificial intelligence algorithm.

In an embodiment, the vision algorithm includes various steps for processing the acquired image (or a portion of the image corresponding to a region of interest) to identify discontinuities. The steps include selecting the acquired image as a base image, and blurring the base image (e.g., via pixel masking) to generate a blurred image. The blurred image and the base image are compared, in an embodiment, by subtracting an image attribute (e.g., gray scale) of the blurred image from a corresponding image attribute of the base image to generate a subtracted image. The subtracted image may be further processed, for example, using a filter or derivation. Discontinuities may then be identified using a machine learning algorithm trained with labeled images, for example.

At block 85, identified discontinuities may be verified. A verification process may be performed, which includes taking an image of the battery cell 10 when the battery cell 10 is in each of multiple deformation states and analyzing the resulting images to verify one or more discontinuities. For example, a first image is acquired when the battery cell 10 is in a non-deformed state. The battery cell 10 is put into a deformed state, in which a tab or other part of the battery cell is elastically deformed. When the battery cell 10 is in the deformed state, a second image is acquired and analyzed. The first and second images may be analyzed and processed as discussed above, and then compared to determine whether a tear or other discontinuity is verified.

The battery cell 10 may be put into a deformed state by elastically deforming a component thereof via application of a selected amount and direction of force to the component. The force is applied such that the deformation is elastic and the component will return to its previous state upon removal of the force.

The first and second images may be compared using any of various techniques. For example, a difference-based technique includes comparing region sizes and subtracting the images to determine changes in features or discontinuities. Other techniques include tracking and comparing key features, determining optical flow, image correlation, and comparing overall signal intensity in localized regions of discontinuities.

The processor, and/or other suitable processing device or control device, can effect one or more actions in response to detecting a discontinuity. The manufacturing process can be changed or modified to address a detected discontinuity or discontinuities, and/or any other suitable remedial action can be taken. For example, the manufacturing process can be paused and a battery cell (in any stage of manufacture) can be removed from a manufacturing station. In another example, the manufacturing process can be adjusted to address a detected discontinuity or discontinuities, and/or to potentially prevent similar discontinuities from arising as subsequent battery cells are manufactured.

Figure 8A:
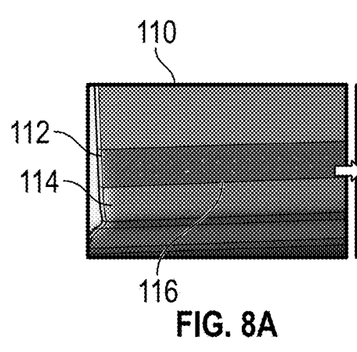
FIGS. 8A-8E depict an example of an image of a battery cell and aspects of an embodiment of a method of determining a region of interest.

FIGS. 8A-8E depict an example of an acquired image 110 of the battery cell 10 and illustrates processing of the image 110. FIG. 8A shows the image 110 as originally taken, which includes a weld region 112, a foil region 114 and a weld line 116.

Figure 8B:
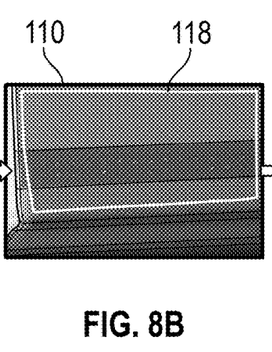

A portion 118 of the image 110 is selected that encompasses at least part of the weld region 112, the foil region 114 and the weld line 116, as shown in FIG. 8B. The portion 118 is selected by accounting for any tilt of the weld region 112. In this example, the portion 118 has a lower edge that is angled to account for the tilt.

Figure 8C:
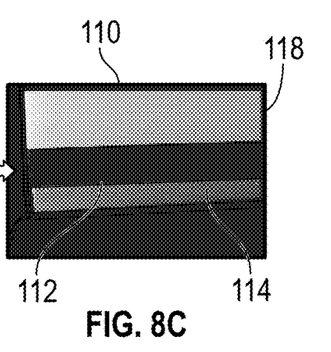

As shown in FIG. 8C, a thresholding rule is applied to the portion 118. A threshold value may be selected to emphasize lighter regions of the battery cell 10 that are known to correspond to the foil region 114, which typically present as a lighter shade than the weld region 112. In this example, the thresholding rule specifies that pixels or sections of the image portion 118 having a gray scale value that is above a selected threshold value are removed from the image.

Figure 8D:
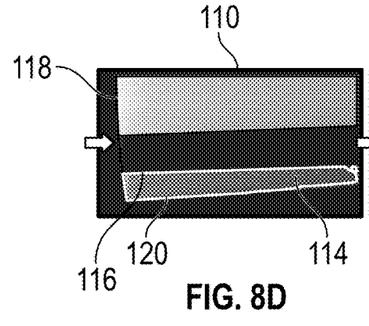

A rule-based or machine learning algorithm is then used to highlight a region of interest 120, which in this example includes the foil region 114 and the weld line 116. The region of interest 120 is shown at FIG. 8D.

Figure 8E:
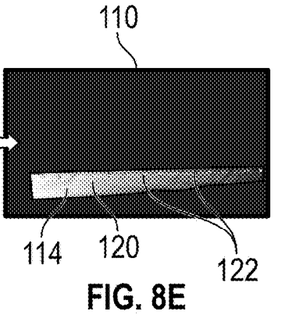

The region of interest 120 is then processed as discussed herein, as part of the vision algorithm, to enhance the visibility of any discontinuities. In this example, as shown in FIG. 8E, the region of interest 120 shows a number of overweld areas 122, which may or may not be considered a discontinuity. In addition, the region of interest 120 shows a potential discontinuity along the overweld areas 122. As discussed in the following example (with reference to FIGS. 9A-9F), the vision algorithm reveals that the potential discontinuity is a tear in the foil region 114.

FIGS. 9A-9F depict an image portion 130 (portion of the image 110) that includes the region of interest 120, and illustrate an example of aspects of using the vision algorithm to detect discontinuities in the region of interest 120. The image portion 130 of the region of interest 120 shows a potential tear along the overweld areas 122 in the foil region 114. The image portion 130 is also referred to as a base image 130.

Figure 9A:
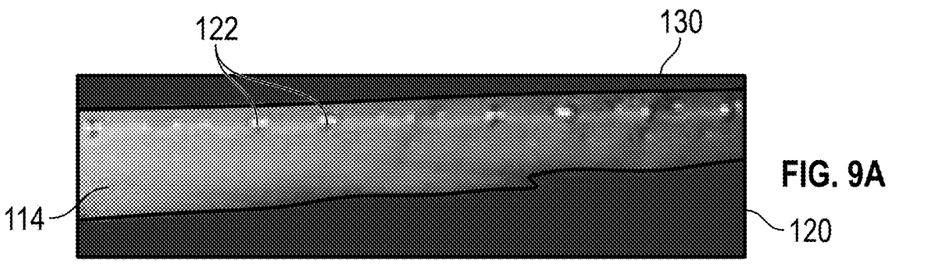
FIGS. 9A-9F depict an example of a portion of a battery cell image corresponding to a region of interest, and depict aspects of an embodiment of an algorithm for automatic detection of discontinuities.

The image portion 130 of the region of interest 120 is then blurred (i.e., sharpness is reduced) to aid in background removal. For example, blurring the region of interest 120 produces a representative image of global background features and/or noise (e.g., features or noise due to contrast inconsistencies) that may be present in the foil region 114, which can be subtracted from the base image 130 to produce an image that emphasizes defects or discontinuities if present. The blurring may be performed using a pixel mask function. Other methods of blurring or sharpness reduction include the application of one or more filters (e.g., a weighted-average filter, a Gaussian filter, etc.). Another method of blurring includes adjusting a zoom scaling factor of an image, which can produce an image that appears blurred.

Figure 9B:
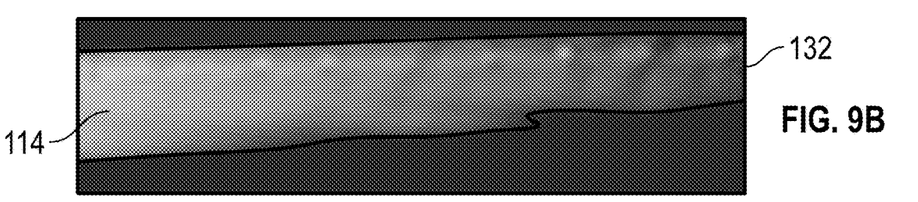

The resulting blurred image 132 is shown in FIG. 9B. The blurred image 132 is also referred to as a reference image 132.

Figure 9C:
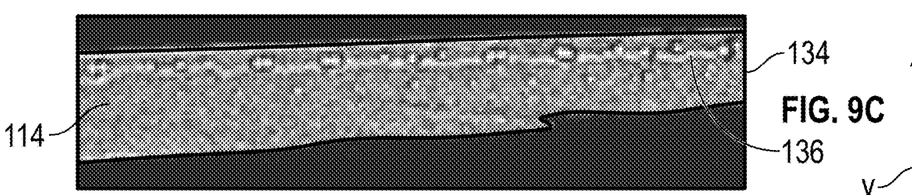

The base image 130 and the reference image 132 are compared to generate an enhanced image 134 shown in FIG. 9C. The enhanced image 134 is generated by subtracting the gray scale value or brightness value of each pixel in the base image 130 from the value in the corresponding pixels of the reference image 132, or vice versa. At this point, a discontinuity such as a foil tear 136 may be identified in the enhanced image 134 (e.g., by visual inspection or a machine learning algorithm).

In some cases, it may be desirable to further process the enhanced image 134 to further emphasize the tear 136 and to bring any other discontinuities into view that may not have been yet detected.

Figure 9D:
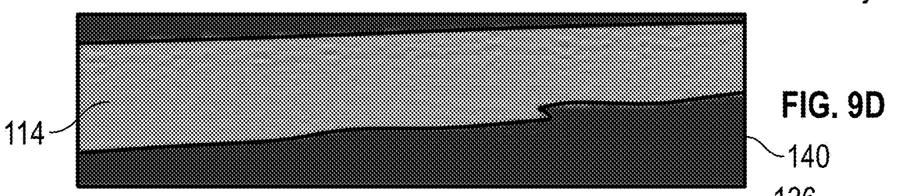
Figure 9E:
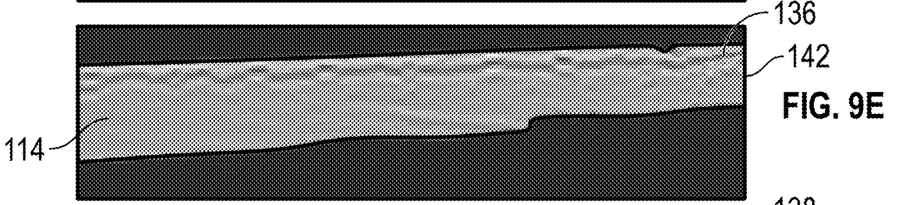

For example, a derivative function such as a Gaussian second order derivative is applied to the enhanced image 134 along a y-direction and/or other selected direction. FIG. 9D shows the resulting image 140. Any suitable derivative may be used, and the derivative may be applied in more than one direction.

If there is significant noise in comparison with the contrast difference between the foil region 114 and the tear 136, a guided filter can be applied to the image 140 to emphasize the difference while still preserving edges in the scene. Filtering the image 140 using the guided filter produces a filtered image 142 shown in FIG. 9E.

Figure 9F:
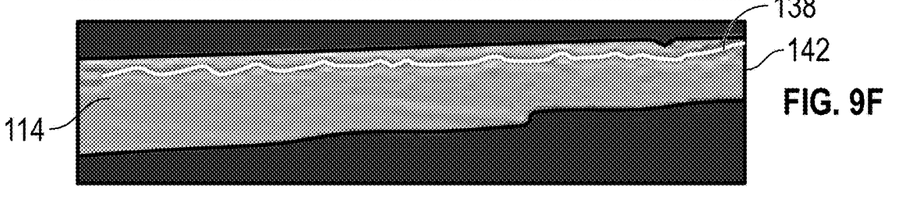

FIG. 9F represents detection or extraction of the tear 136. In this example, tear detection includes applying a Gaussian line fit function, but is not so limited. A highlight line 138 represents identification of the tear 136.

The systems and methods described herein may be applicable to various types of batteries. In an embodiment, battery cells evaluated may be cells used in electric and/or hybrid vehicles; however, the systems and methods are not so limited.

Figure 10:
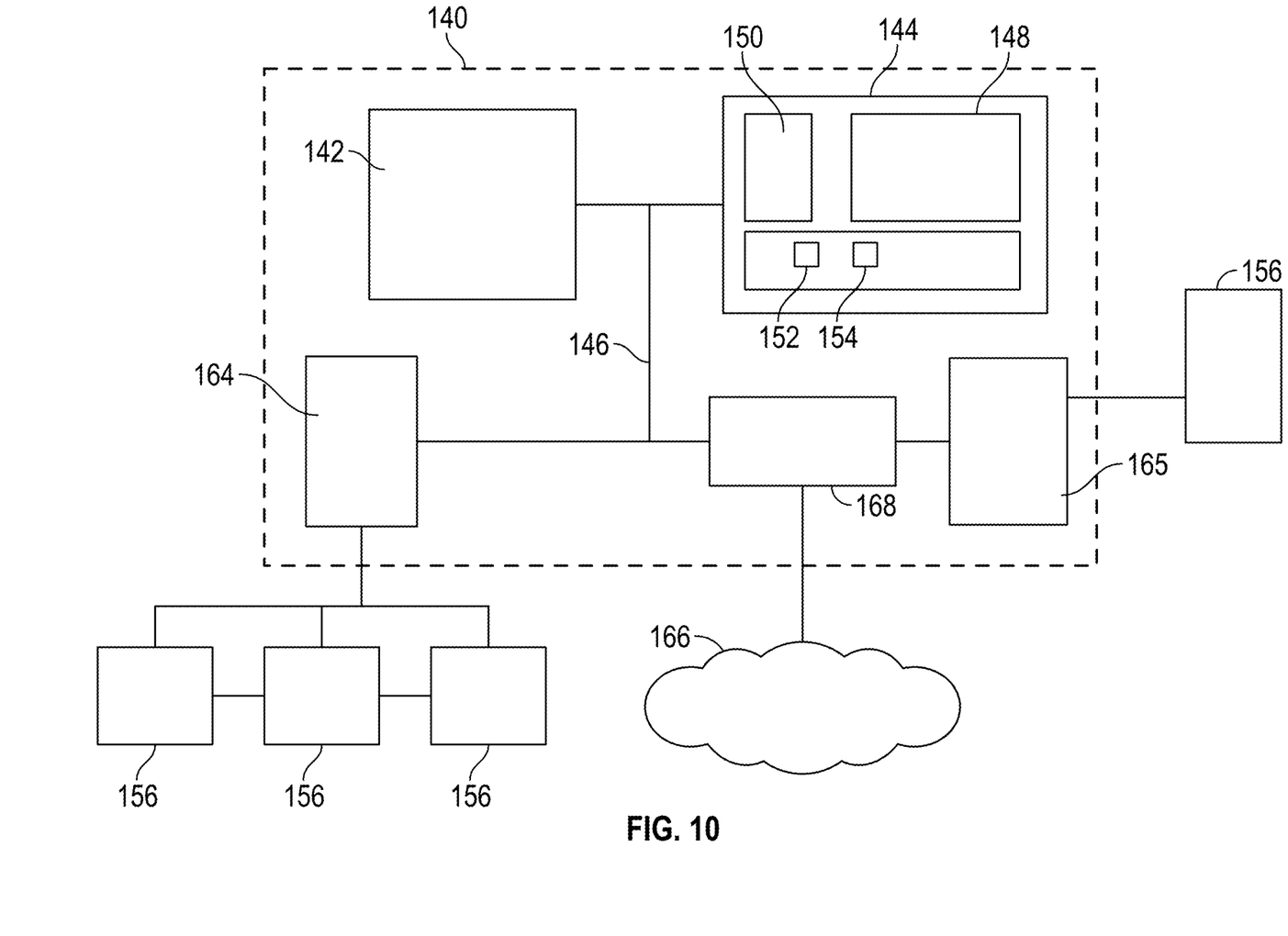
FIG. 10 depicts a computer system in accordance with an embodiment.

FIG. 10 illustrates aspects of an embodiment of a computer system 140 that can perform various aspects of embodiments described herein. The computer system 140 includes at least one processing device 142, which generally includes one or more processors for performing aspects of image acquisition and analysis methods described herein.

Components of the computer system 140 include the processing device 142 (such as one or more processors or processing units), a memory 144, and a bus 146 that couples various system components including the system memory 144 to the processing device 142. The system memory 144 can be a non-transitory computer-readable medium, and may include a variety of computer system readable media. Such media can be any available media that is accessible by the processing device 142, and includes both volatile and non-volatile media, and removable and non-removable media.

For example, the system memory 144 includes a non-volatile memory 148 such as a hard drive, and may also include a volatile memory 150, such as random access memory (RAM) and/or cache memory. The computer system 140 can further include other removable/non-removable, volatile/non-volatile computer system storage media.

The system memory 144 can include at least one program product having a set (e.g., at least one) of program modules that are configured to carry out functions of the embodiments described herein. For example, the system memory 144 stores various program modules that generally carry out the functions and/or methodologies of embodiments described herein. A module or modules 152 may be included to perform functions related to acquiring images. An image analysis module 154 may be included for post-processing of images and/or comparison of images as described herein. The system 140 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 142 can also communicate with one or more external devices 156 as a keyboard, a pointing device, and/or any devices (e.g., network card, modem, etc.) that enable the processing device 142 to communicate with one or more other computing devices. Communication with various devices can occur via Input/Output (I/O) interfaces 164 and 165.

The processing device 142 may also communicate with one or more networks 166 such as a local area network (LAN), a general wide area network (WAN), a bus network and/or a public network (e.g., the Internet) via a network adapter 168. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

Embodiments described herein address a number of problems associated with technical fields related to battery cells. Such technical fields include battery cell manufacturing, testing and inspection, battery cell installation, and automotive fields in which battery cells are utilized. The problems include difficulties in detecting tears and other discontinuities (whether during or after manufacture). Problems can also occur in existing inspection techniques, such as inefficiencies resulting from the need for manual inspection and/or cell disassembly. The embodiments described herein provide solutions to these problems and thereby effectuate an improvement to the technical fields.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A system for evaluating a battery cell, comprising:
an imaging device configured to take an image of at least part of the battery cell; and
a processor configured to acquire the image and perform:
determining a region of interest in the acquired image, the region of interest being a portion of the acquired image, wherein determining the region of interest is based on at least one of a rule-based algorithm that includes a location-based rule, an image attribute threshold and a machine learning algorithm;
reducing a sharpness of the region of interest of the acquired image to generate a reference image;
comparing the region of the interest of the acquired image and the reference image; and
identifying a discontinuity of the battery cell based on a difference between the region of the interest of the acquired image and the reference image.

2. The system of claim 1, further comprising a deformation assembly configured to elastically deform the at least part of the battery cell.

3. The system of claim 2, wherein the imaging device is configured to take a plurality of images of the at least part of the battery cell in a plurality of deformation states, and verify the identified discontinuity based on the plurality of images.

4. The system of claim 1, wherein the comparing includes subtracting an image attribute of the reference image from an image attribute of the region of interest of the acquired image to generate a subtracted image, the subtracted image providing an enhanced view of the discontinuity.

5. The system of claim 4, wherein the image attribute is selected from at least one of a brightness, a contrast and a gray scale.

6. The system of claim 4, wherein the comparing includes at least one of applying a derivative in a selected direction on the subtracted image, and applying a filter to the subtracted image.

7. The system of claim 1, wherein the location-based rule specifies a location of a section of the image that includes one or more features of interest, the image attribute threshold is associated with the one or more features of interest; and
the machine learning algorithm is configured to identify the region of interest based on training images of the battery cell and/or one or more similar battery cells.

8. A method of evaluating a battery cell, comprising:
acquiring an image of at least part of the battery cell;
determining a region of interest in the acquired image, the region of interest being a portion of the acquired image, wherein determining the region of interest is based on at least one of a rule-based algorithm that includes a location-based rule, an image attribute threshold and a machine learning algorithm;
reducing a sharpness of the region of interest of the acquired image to generate a reference image;
comparing the region of interest of the acquired image and the reference image; and
identifying a discontinuity of the battery cell based on a difference between the region of interest of the acquired image and the reference image.

9. The method of claim 8, wherein the acquired image is acquired using direct x-ray radiography.

10. The method of claim 8, wherein the comparing includes subtracting an image attribute of the reference image from an image attribute of the region of interest of the acquired image to generate a subtracted image, the subtracted image providing an enhanced view of the discontinuity.

11. The method of claim 10, wherein the image attribute is selected from at least one of a brightness, a contrast and a gray scale.

12. The method of claim 10, wherein the comparing includes at least one of: applying a derivative in a selected direction on the subtracted image, and applying a filter to the subtracted image.

13. The method of claim 8, wherein determining the region of interest is determined based on a rule-based algorithm configured to identify the region of interest based on a rule that specifies a location of a section of the image that includes one or more features of interest, and/or an image attribute threshold associated with the one or more features of interest.

14. The method of claim 8, wherein determining the region of interest is based on a machine learning algorithm configured to identify the region of interest based on training images of at least one of: the battery cell and one or more similar battery cells.

15. The method of claim 8, wherein acquiring the acquired image is performed in-line during a process of manufacturing the battery cell.

16. A system for evaluating a battery cell, comprising:
an imaging device configured to automatically take one or more images of at least part of the battery cell in conjunction with a process of manufacturing the battery cell, the imaging device including an x-ray source and an x-ray detector mounted on a support structure, the support structure disposed on at least one of a battery cell manufacturing station and a battery cell inspection station; and
a processor configured to acquire the image and process a portion of the acquired image to identify a discontinuity of the battery cell, the portion of the acquired image being a region of interest in the acquired image, the processor configured to determine the region of interest based on at least one of a rule-based algorithm that includes a location-based rule, an image attribute threshold and a machine learning algorithm.

17. The system of claim 16, wherein the processor is configured to perform:
reducing a sharpness of the portion of the acquired image to generate a reference image;
comparing the portion of the acquired image and the reference image; and
identifying the discontinuity of the battery cell based on a difference between the portion of the acquired image and the reference image.

18. The system of claim 17, wherein the comparing includes subtracting an image attribute of the reference image from an image attribute of the portion of the acquired image to generate a subtracted image, the subtracted image providing an enhanced view of the discontinuity.

19. The system of claim 18, wherein the comparing includes at least one of: applying a derivative in a selected direction on the subtracted image, and applying a filter to the subtracted image.

20. The system of claim 16, wherein the imaging device is configured to automatically take the one or more images in-line during the process of manufacturing the battery cell.

\* \* \* \* \*